Nov. 6, 1956 — J. A. BUDNIAK — 2,769,469
RESILIENT ROD SAW FRAME
Filed Feb. 7, 1955
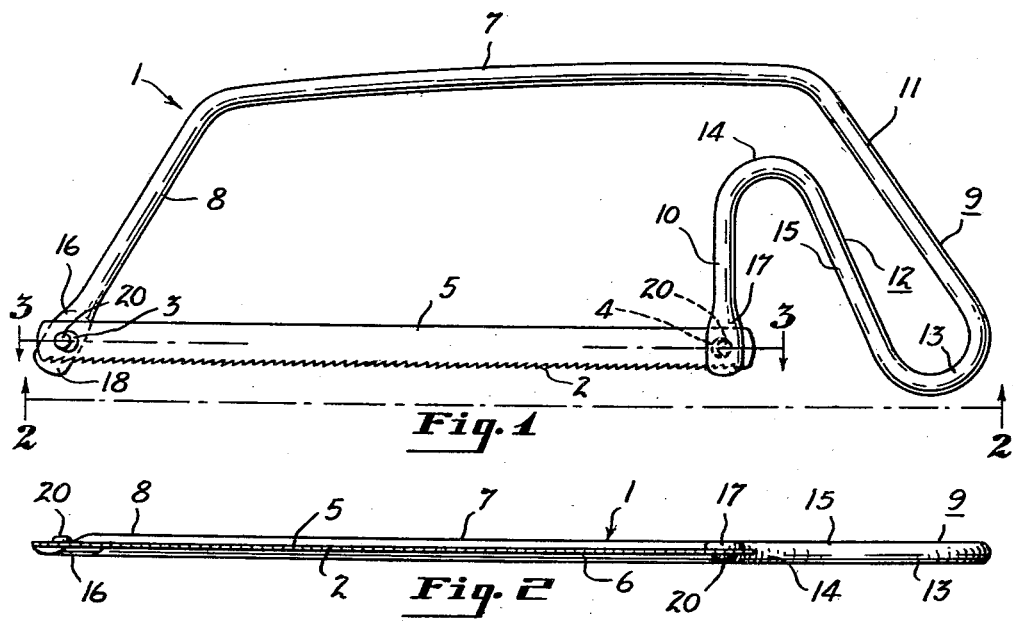
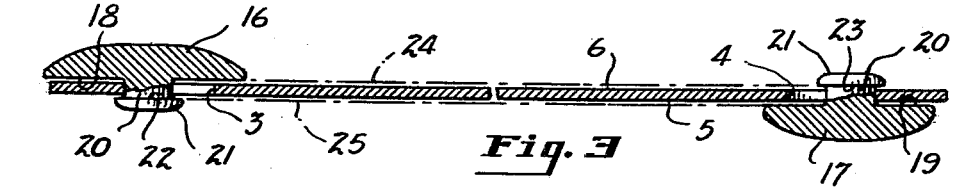
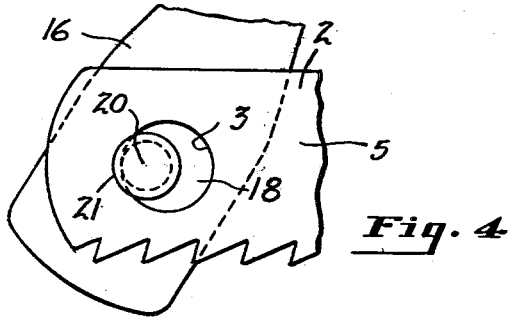
INVENTOR
John A. Budniak
BY Evans + McCoy
ATTORNEYS UnitedStates Patent Office 2,769,469
Patented Nov. 6, 1956

2,769,469

RESILIENT ROD SAW FRAME

John A. Budniak, Cleveland, Ohio

Application February 7, 1955, Serial No. 486,500

3 Claims. (Cl. 145—33)

The present invention relates to an improved saw frame and more particularly to a one-piece resilient metal frame for hack saw blades which is particularly useful for cutting meat and similar articles.

According to the present invention, a one-piece saw frame is made by subjecting a metal rod to a plurality of forming operations such as bending, coining, and the like. The frame is bent in such a way as to provide a longitudinally extending back member having a saw-blade-attaching leg extending from one end thereof and a handle and saw-blade-attaching leg extending from the opposite end thereof, the ends of said legs remote from said back member being shaped to provide substantially flat surfaces for engaging the opposite flat side faces of a saw blade. Suitable means, such as a lug or the like, may be provided at the end of each of said blade-attaching legs for holding an end portion of the saw blade with its side face in abutting relation to the flat surface of the leg. Since the legs engage both side faces of the saw blade, they are able to position the blade securely and to resist effectively twisting movements of the blade and other movements which tend to cause the blade to become detached from the frame.

An object of the present invention is to provide a one-piece saw frame which is simple, which may be economically manufactured, which may readily be assembled and disassembled, which is durable and substantially noncorrosive, which may easily be kept clean, and which effectively holds hack saw blades during use.

Other objects, uses and advantages of the invention will become apparent to one skilled in the art from the following description and from the drawings in which:

Figure 1 is a top plan view on a reduced scale of a hack saw made according to the present invention;

Figure 2 is a side elevational view of the hack saw as indicated by the line 2—2 in Fig. 1 and on the same scale;

Figure 3 is a fragmentary vertical sectional view with parts broken away taken substantially on the line indicated at 3—3 in Fig. 1 and on a larger scale; and Figure 4 is a fragmentary top view with parts omitted similar to Fig. 1 and on a larger scale showing how the saw blade is attached to the frame.

It will be understood that Figs. 1 to 4 are drawn to scale except as to the thickness of the saw blade in Fig. 3 and that the saw frame of the present invention may have exactly the same size and shape as shown herein or may have various other equivalent forms as will become apparent to those skilled in the art from the following disclosure.

Referring more particularly to the drawings, in which like parts are identified with the same numerals throughout the several views, Figs. 1 and 2 show an integral one-piece saw frame 1 in the form of a bent rod having its axis located in a single plane and a conventional hack saw blade 2 having circular attaching holes 3 and 4 at its opposite ends and flat side faces 5 and 6 located in planes parallel to the plane containing the axis of said rod.

The frame 1 is in the form of a relatively stiff resilient metal rod of circular cross section substantially throughout its length that is bent to provide a longitudinally extending back member 7, a saw-blade-attaching leg 8 at one end of the frame, and a handle 9 and saw-blade-attaching leg 10 at the opposite end of the frame. The rod is bent at the forward end of the back member 7 to form the leg 8 and is similarly bent at the opposite end of the back member to form a straight portion 11 of the handle 9 that extends rearwardly and transversely. The rod is further bent, at the end of said portion 11 remote from the back member 7, first in one direction and then in the opposite direction to form a substantially S-shaped portion 12 including a U-shaped portion 13 at the bottom of the handle 9, an inverted U-shaped portion 14 near the upper end of the handle, and a straight handle portion 15 integrally joining said U-shaped portions. The leg 10 is integrally connected to the portion 14 and extends transversely from said portion in a direction away from and substantially perpendicular to the back member 7. The leg 8 also extends generally transversely to said back member and generally in the same transverse direction as the leg 10 as shown in Fig. 1.

The legs 8 and 10 are provided with flattened end portions 16 and 17 which are spaced from the back member 7. These portions are shaped to provide substantially flat parallel blade-engaging surfaces 18 and 19 which are parallel to and substantially in the plane containing the axis of the rod forming the saw frame. The surfaces 18 and 19 face in opposite directions so that the frame 1 engages both of the faces 5 and 6 of the blade 2 when the blade is mounted on the frame.

Since the rod forming the saw frame shown herein is bent in such a manner that the axis thereof is substantially in a single plane, the portions of said rod between the end portions 16 and 17 are tangent over their entire lengths to a pair of parallel planes spaced by the thickness of said rod and the surface 18 faces one of said planes while the surface 19 faces the other of said planes.

Each of the flattened portions 16 and 17 is provided with means for holding the saw blade against the flat blade-engaging surface of that portion. Such means may, for example, be a lug that is rigidly connected to each of said flattened portions and is preferably in the form of an integral lug having a head engageable with the face of the saw blade. As herein shown each of the flattened portions 16 and 17 is provided with an integral lug 20 of circular cross section throughout its height and having an axis perpendicular to the flat surfaces 18 and 19. The parallel lugs 20 project in opposite directions and terminate in integral flattened heads 21 having flat annular blade engaging surfaces 22 and 23 parallel to and facing the flat surfaces 18 and 19 respectively. The flat surfaces 18, 19, 22 and 23 are located in a single pair of parallel planes 24 and 25 shown in dotted lines in Fig. 3. The surfaces 18 and 23 are located in the plane 24, and the surfaces 19 and 22 are located in the plane 25. The faces 5 and 6 of the blade 2 are preferably spaced apart a distance slightly less than that between the planes 24 and 25 to facilitate mounting of the blade on the frame 1. The distance between the blade-engaging surfaces 18 and 22 and between the surfaces 19 and 23 is preferably about .003 to .007 inches greater than the thickness of the blade 2 so that the blade may easily be mounted on the frame and will at the same time be held against twisting movement by the heads 20.

The lugs 20 have a substantially uniform diameter between the planes 24 and 25 and have a larger diameter at the heads 21, but the diameter of the heads 21 is less than the interal diameter of the circular holes 3 and 4 so that the lugs may be inserted in or removed from said holes. The saw frame 1 is bent during manufacture in such a manner that the distance between the lugs 20 is substantially greater than the distance between the holes 3 and 4 when such saw frame is in the normal unstressed condition so that the resilient frame must be compressed to permit mounting of the blade 2 and so that a substantial tension will be applied to said blade after it is mounted on said frame. The distance between the lugs 20 when the frame 1 is in its normal unstressed condition may, for example, be 5% to 10% or so greater than the distance between the lug-engaging surfaces of the holes 3 and 4 whereby each lug is pressed outwardly as shown in Fig. 4 against one of said lug engaging surfaces when the blade is mounted on the frame.

The present invention provides a simple and economical method for making a saw frame. According to this method the frame is made in one piece from a rod of relatively stiff resilient metal. The rod may be, for example, a cold-rolled steel rod of circular cross section that is plated with a corrosion resistant metal such as nickel, chromium or the like. The resilient saw frame 1 shown in the drawings is made from a one-quarter inch round cold-rolled steel rod which is bent to the shape shown in the drawings so as to form the handle and blade-attaching legs and which is plated with copper, nickel and chromium so as to be corrosion resistant and suitable for use in cutting meat and other foods.

Each of the end portions 16 and 17 of the blade attaching legs 8 and 10 is formed in an identical manner by means of a coining operation. In the saw frame herein each of the end portions 16 and 17 is formed by coining one end of the steel rod so as to extrude a small blade attaching lug while simultaneously flattening a portion of the rod around said lug to form one of the flat blade-engaging surfaces 18 and 19. The one-quarter inch round rod forming the frame shown in the drawings is preferably coined in such a manner that each of the blade-attaching lugs is extruded during the coining operation to a height of about 1/10 of an inch. The lug is then hammered or peened at its outer end to enlarge said end rrdially and to form the head 21. By the use of suitable tools, such as a spinning tool or the like, the head 21 may be formed with one of the flat annular blade-engaging surfaces 22 and 23 under the marginal portion of the head. Each end of the legs 8 and 10 may be formed in the same manner, but the lugs 20 and the blade-engaging surfaces of the end portions 16 and 17 are arranged to face in opposite directions.

The hack saw frame 1 is adapted to receive conventional hack saw blades made of high carbon steel and other suitable materials. Such blades may readily be mounted on the frame by first attaching one end of the blade to the lug of the portion 16, placing said portion 16 against a stationary or immovable object, and pushing the leg 10 toward the leg 8 by gripping and pushing on the handle 9 with one hand while simultaneously guiding the lug of the portion 17 into the circular hole at the opposite end of the blade. A similar procedure in substantially reverse order may be followed to remove the blade 2 from the frame 1.

It will be understood that, in accordance with the patent statutes, variations and modifications of the specific devices disclosed herein may be made without departing from the spirit of the invention.

Having described my invention, I claim:

1. An integral one-piece saw frame for a longitudinal hack saw blade having an attaching hole at each end thereof and having flat side faces located in parallel planes, said frame comprising a single relatively stiff resilient metal rod of substantially uniform cross-sectional area throughout its length forming a longitudinally-extending back member that is curved at each end to form a leg at one end thereof and a handle and leg at the opposite end thereof, said legs being aligned so that the axes thereof are located substantially in a single plane and extend generally transversely to said back member, each of the ends of said legs remote from said back member being provided with a blade-attaching lug projecting outwardly in a direction substantially perpendicular to said single plane and a substantially flat surface around said lug adjacent to and substantially parallel to said single plane for engaging one of said flat side faces of said blade around the margin of one of said holes therein, the lugs on the ends of said legs extending in opposite directions away from said single plane and being constructed to fit in said holes and to hold the opposite side faces of said blade against the flat surfaces of said legs, said lugs being spaced apart longitudinally of said back member a distance greater than the distance between said holes when said frame is in the normal unstressed condition so that a substantial tension will be applied to said blade when it is mounted on said frame.

2. A one-piece saw frame comprising a relatively stiff resilient metal rod of generally circular cross-section forming a longitudinally-extending back member and being curved at each end to form a saw-blade-attaching leg at one end thereof and a handle and saw-blade-attaching leg at the opposite end thereof, said back member and said blade-attaching legs being alined so that opposite sides thereof are tangent over substantially their entire lengths to a single pair of parallel planes spaced by the thickness of said rod, said legs extending generally transversely to said back member in the same general direction from said back member, the end of one of said legs being provided with a substantially flat blade-engaging surface on one side thereof facing one of said planes, the end of the other of said legs being provided with a substantially flat blade-engaging surface on the opposite side thereof facing the other of said planes, and each of said blade-attaching surfaces having a blade-attaching lug projecting therefrom toward the one of said planes faced thereby and terminating in a radially enlarged head.

3. A method of making a unitary one-piece hack saw frame comprising coining one end of a cold-rolled steel rod of circular cross section so as to extrude a small saw-blade-attaching lug while simultaneously flattening the portion of the rod around said lug to form a substantially flat blade-engaging surface, peening the end of said lug to form a head having a flat peripheral blade-engaging surface facing and substantially parallel to said first-named blade-engaging surface, forming the opposite end of said rod in the same manner to form a lug and blade-engaging surface facing in the opposite direction, bending one end of said rod to form a handle and a saw-blade-attaching leg, and bending the opposite end of said rod to form another saw-blade-attaching leg having its axis located substantially in the same plane as that of said first-named leg.

References Cited in the file of this patent

UNITED STATES PATENTS

| 747,735 | Lawrence | Dec. 22, 1903 |
| 1,091,404 | Tilden | Mar. 24, 1914 |
| 1,413,182 | Nesmeyer | Apr. 18, 1922 |
| 2,559,686 | Suhre | July 10, 1951 |

FOREIGN PATENTS

| 548,625 | France | Oct. 28, 1922 |
| 400,299 | Great Britain | Oct. 26, 1933 |